(12) United States Patent
Stephan

(10) Patent No.: US 6,612,208 B1
(45) Date of Patent: Sep. 2, 2003

(54) SPINDLE NUT HOLDER FOR A SPINDLE GEAR FOR DRIVING LEVERS

(75) Inventor: Juergen Stephan, Dresden (DE)

(73) Assignee: Forschungszentrum Rossendorf e.V., Schoenfeld-Weissig (DE)

( * ) Notice: Subject to any disclaimer, the term of this patent is extended or adjusted under 35 U.S.C. 154(b) by 42 days.

(21) Appl. No.: 09/669,166

(22) Filed: Sep. 25, 2000

(30) Foreign Application Priority Data

Oct. 6, 1999 (DE) .......................................... 199 48 050

(51) Int. Cl.[7] .......................... B23B 19/02; B23B 25/00
(52) U.S. Cl. .............................. 82/146; 82/147; 82/173
(58) Field of Search ........................... 82/146, 147, 151, 82/150, 173, 905; 72/387, 389.7, 389.8; 74/89.31, 89.36, 353, 840

(56) References Cited

U.S. PATENT DOCUMENTS

| 3,421,712 A | * | 1/1969 | Scroggie et al. | 242/575.2 |
| 3,498,542 A | * | 3/1970 | Hefner et al. | 239/737 |
| 3,536,373 A | * | 10/1970 | Bird et al. | 359/486 |
| 3,981,566 A | * | 9/1976 | Frank et al. | 359/224 |
| 4,299,316 A | * | 11/1981 | Reinmoeller | 192/30 W |
| 5,622,075 A | * | 4/1997 | Deutschewitz et al. | 72/387 |
| 6,279,692 B1 | * | 8/2001 | Siepker et al. | 188/105 |
| 6,343,671 B1 | * | 2/2002 | Ackermann et al. | 180/443 |

OTHER PUBLICATIONS

Deutschen Elektronen Synchtrotrons DESY, Hamburg, TESLA–Design Report 95–01, p. 158, Fig. 4.22.

* cited by examiner

Primary Examiner—Henry W. H. Tsai
(74) Attorney, Agent, or Firm—Jordan and Hamburg LLP

(57) ABSTRACT

Spindle nut holder for a spindle gear which drives a lever and functions under extreme conditions such as in a vacuum, under radiation exposure, and at a temperature close to absolute zero. The spindle nut holder includes a spindle nut and strip-shaped links each having an elongated, narrow cross section. One end of each link is connected to the spindle nut and the other end is connected to a frame. A pair of links are arranged on opposite sides of the spindle nut holder and each is oriented perpendicular to the spindle axis and the cross-section provides longer sides and shorter sides, the longer sides being parallel to the spindle axis. The cross-section of another link provides longer sides and shorter sides and is arranged relative to the pair of links such that the longer sides of this link are perpendicular to the longer sides of the pair of links.

18 Claims, 4 Drawing Sheets

SPINDLE NUT HOLDER FOR A SPINDLE GEAR FOR DRIVING LEVERS

FIELD OF THE INVENTION

The present invention relates generally to a spindle nut holder for a spindle gear for driving levers. More particularly, the present invention relates to a spindle nut holder for a spindle gear for use in extreme operating conditions.

BACKGROUND OF THE INVENTION

In connection with the use of a spindle gear, simultaneous operations in a vacuum at a temperature near absolute zero and under gamma or x-ray exposure are considered to be extreme operating conditions. The spindle nut holding device for such a spindle gear must also be capable of traverse resolutions in the nanometer range under the above-described extreme operating conditions.

Prior art constructions for spindle nut holders are generally known and can be found, for instance, in lever mechanisms, which are driven by a spindle, for example, in adjustable compasses, in measuring drives or with elevating platforms and screw jacks that have mutually crossing mechanisms (slidable lattice grate). The prior art constructions use trunnion or conic bearings for the rotational axis of the spindle nut. A spindle gear, which must work under extreme operating conditions is described on page 158 in the TESLA Design report 95-01 of the German Electron Synchrotrone DESY (Deutsches Elektronen Synchroton) in Hamburg. In this Design report, FIG. 4.22 shows a forked spindle nut holder with ball bearing trunnions on the spindle nut.

Under the above-mentioned extreme operating conditions, it is a problem that such bearings result in jamming and excessive bearing clearance, which can only be reduced, or at least temporarily avoided, through the presence of costly anti-friction coatings.

SUMMARY OF THE INVENTION

It is an object of the invention is to provide a spindle nut holder for a lever-driving spindle gear, which will also function reliably under extreme operating conditions such as in a vacuum, under radiation exposure, and at a temperature close to absolute zero, and which permanently realizes an exact path resolution in the nanometer range.

Pursuant to the invention, this objective is accomplished by providing a spindle nut holder including a spindle nut defining a spindle axis, a frame arranged around the spindle nut and a plurality of strip-shaped links each having an elongated, narrow cross section and first and second ends. The first end of each link is connected to the spindle nut and the second end of each link is connected to a common support frame. The links including a pair of first links and at least one second link. The first links are oriented in a direction perpendicular to the spindle axis and the cross section of the first links provides longer sides and shorter sides. The longer sides of the cross section of the first links are parallel to the spindle axis. The cross section of the second link also provides longer sides and shorter sides. The first links and the second link are arranged relative to one another such that the longer sides of the cross section of the second link are perpendicular to the longer sides of the cross section of the first links. In other words, the cross sectional orientation of the first link is offset from the cross sectional orientation of the second link by 90°.

An essential advantage of a spindle nut holder for a spindle gear in accordance with the invention is the absence of clearance and friction at bearings for holding the spindle nut at the driven lever. A further advantage of a spindle nut holder in accordance with the invention is the absence of riveted, bolted, clamped, soldered or welded connections at the holder itself, which are normally required for spindle nut holders manufactured from component parts.

BRIEF DESCRIPTION OF THE DRAWINGS

The invention is explained in greater detail below by way of an example. In the accompanying drawings.

DETAILED DESCRIPTION OF THE INVENTION

Figure 1:
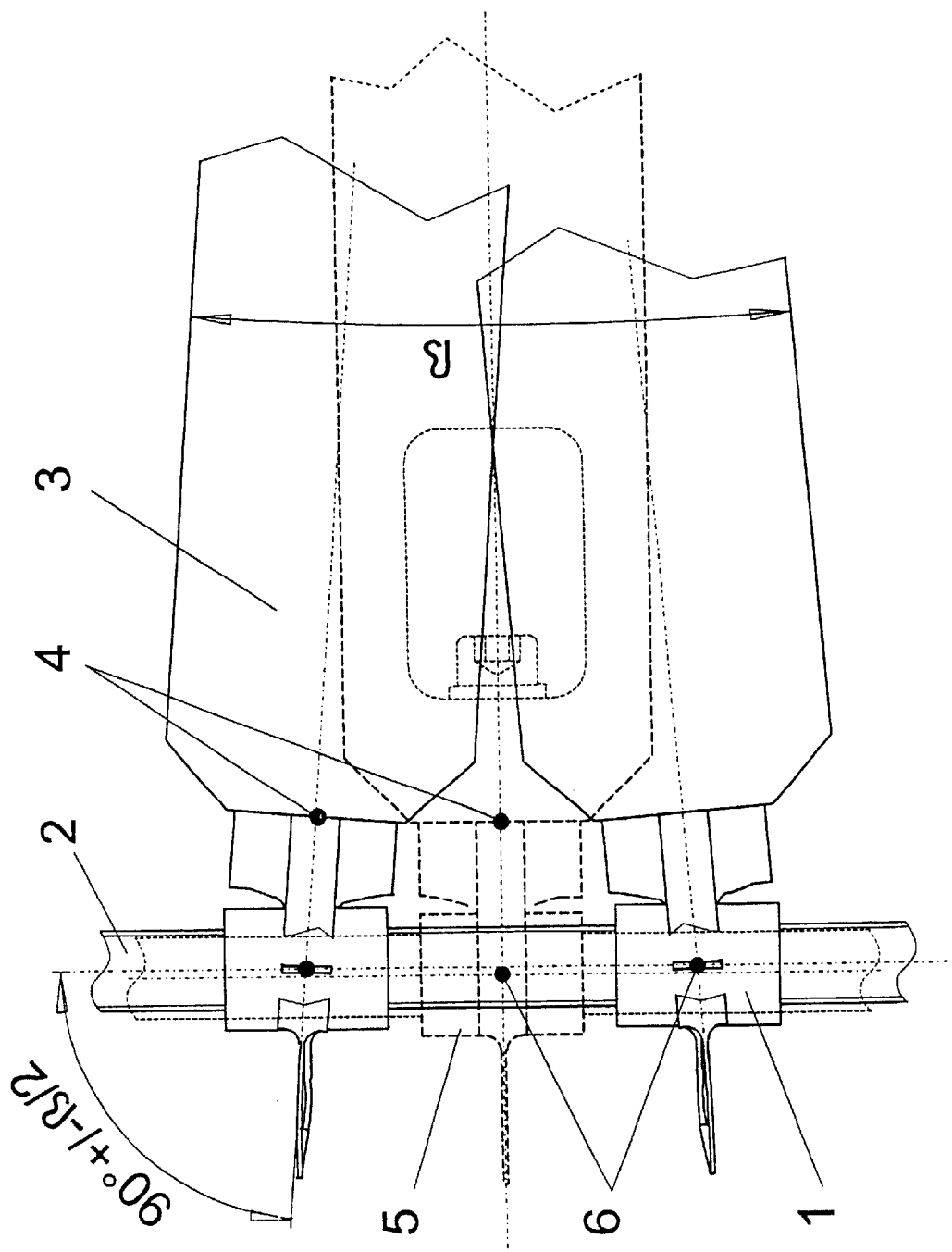
FIG. 1 shows the spindle nut holder in accordance with the invention in its phases of motion.

Referring to FIGS. 1–4, a spindle nut 1 is connected with a movable lever 3 at a point of connection 4. The movement of the spindle nut 1 takes place along an axis 6 when it is moved from its rest position 5 by the spindle 2.

Figure 2:
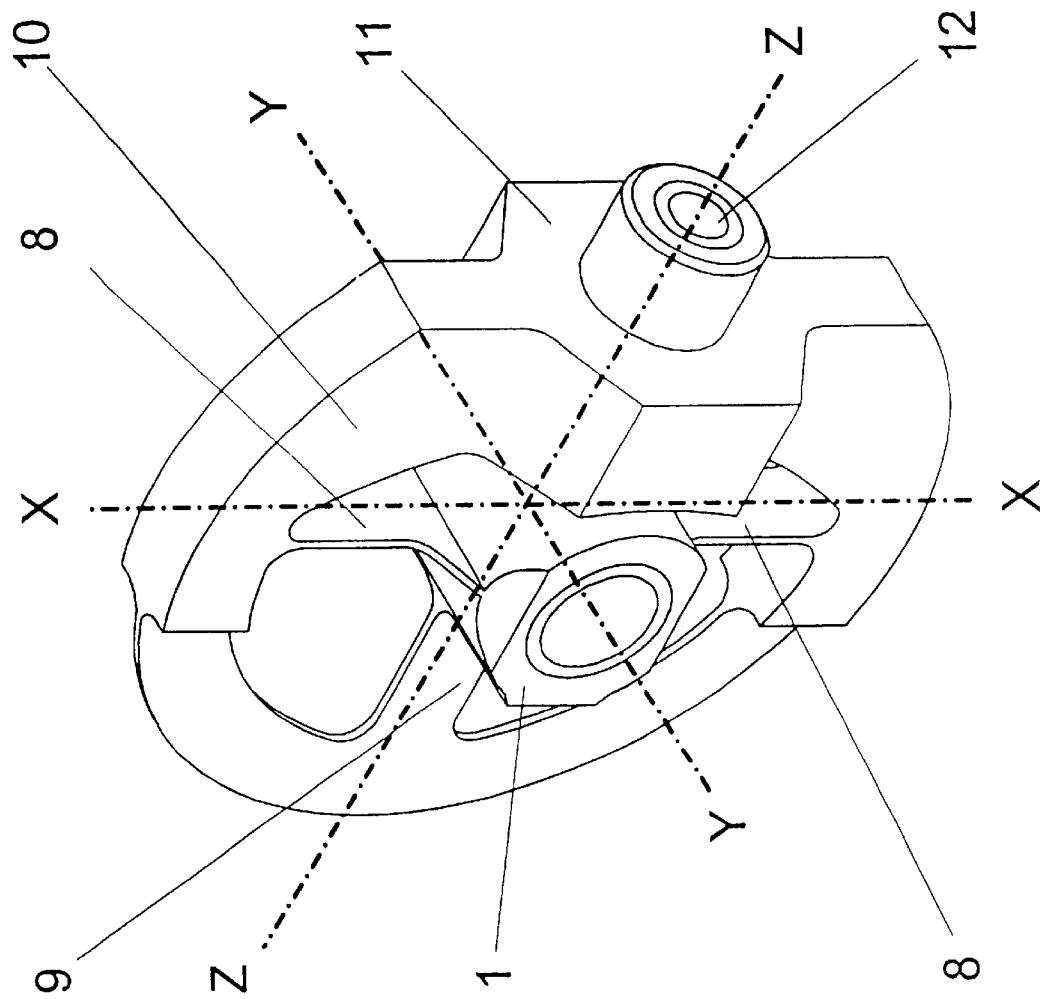
FIG. 2 shows a perspective view of the spindle nut holder with its axes x, y and z.
Figure 3:
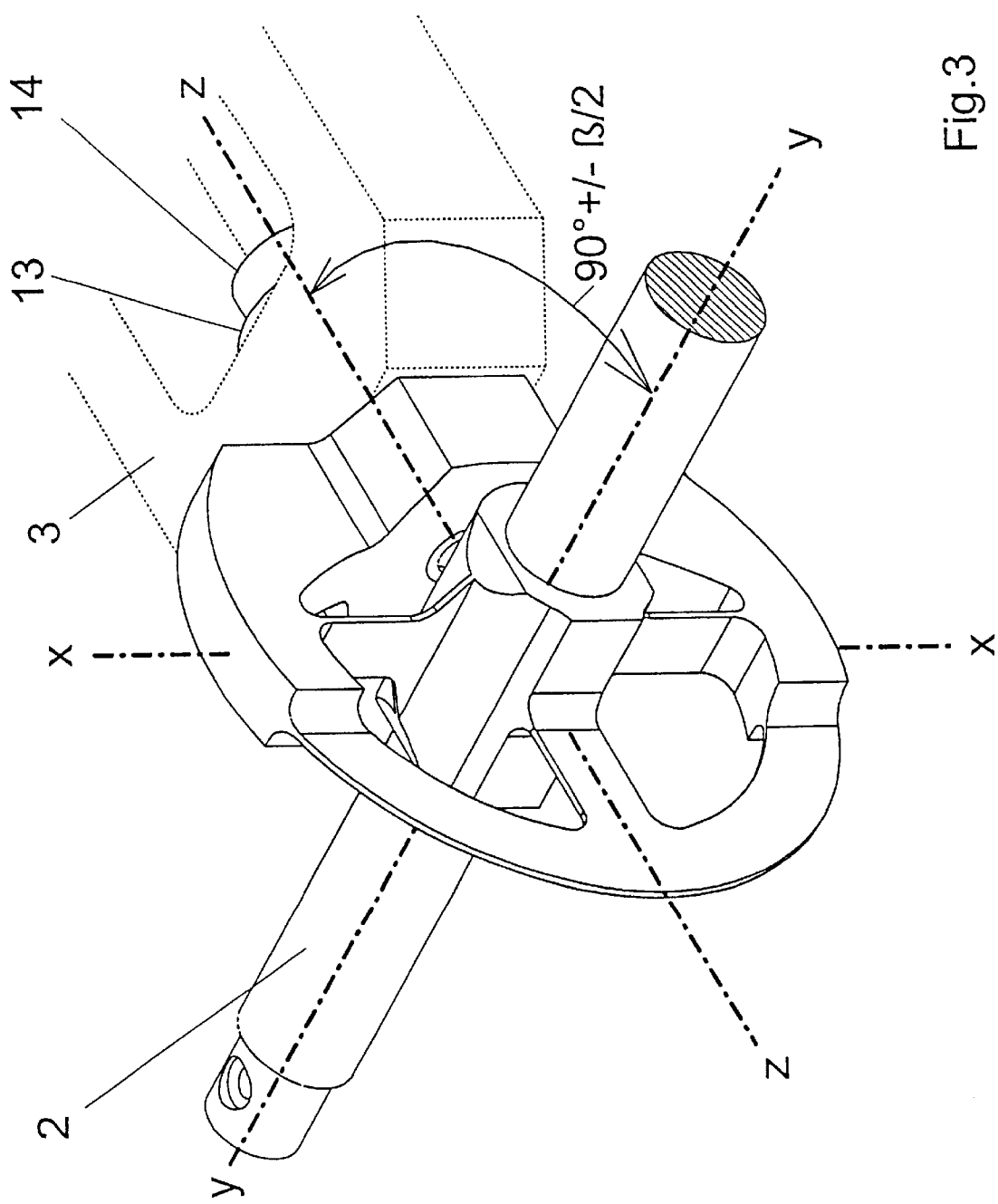
FIG. 3 shows the spindle nut holder connected to the lever which is to be moved.

In the spindle gear, a spindle nor holder manufactured from a non-magnetic, cryogenic material is used and is designed and constructed so that the parts 1 and 8–12 can be manufactured together from one blank or workpiece without parting or separation lines or joint clearance. More specifically, as shown in FIG. 2, a spindle nut 1 is connected with a holding frame 10 in the X direction by two flexible links 8. Similarly, a flexible link 9 leads from the holding frame 10 in the Z direction to the spindle nut 1. Since the links 8 are oriented in the X direction and the link 9 is oriented in the Z direction, the links 8 are perpendicular to (at a 90° angle to) the link 9. Although FIG. 2 shows one pair of links 8 and a single link 9, it is also possible to have a pair of links 9 with a pair of links 8, the second link 9 being on an opposite side of the spindle nut 1 from the link 9 shown in FIG. 2, or only a single link 8 and a single link 9 perpendicular to one another.

The flexibility of the link 9 permits the spindle nut 1 to be rotated around axis "x—x", which functionally corresponds to the axis of rotation 6 in FIG. 1 and is reproduced by the links 8. The flexible link 9 prevents a slight rotation of the spindle nut 1 through static friction when the spindle is rotated around axis "y—y", which would result in a jerky motion (slip stick feet). The connection to the lever 3, which is to be driven, is brought about by the contacting pressure surface 11, a centering pin 12 with a threaded borehole, a friction washer 13 and a necked-down bolt 14 such that the tensile stress in the bolted connection increases with decreasing temperature, when suitable materials are selected. As a result, the frictional connection between the lever 3 and the contacting pressure surface 11 increases. During the fastening of the holder 15 to the lever 3, the holder 15 must be adjusted by rotation about the axis "z—z". If the adjustment is lost due to shrinkage distortion during cooling, the holder 15 must be attached to the lever 3 over a coupling piece 16, which can be formed together with the holder 15 from one blank or workpiece without joints, in order to avoid any joint clearance between these parts.

Figure 4:
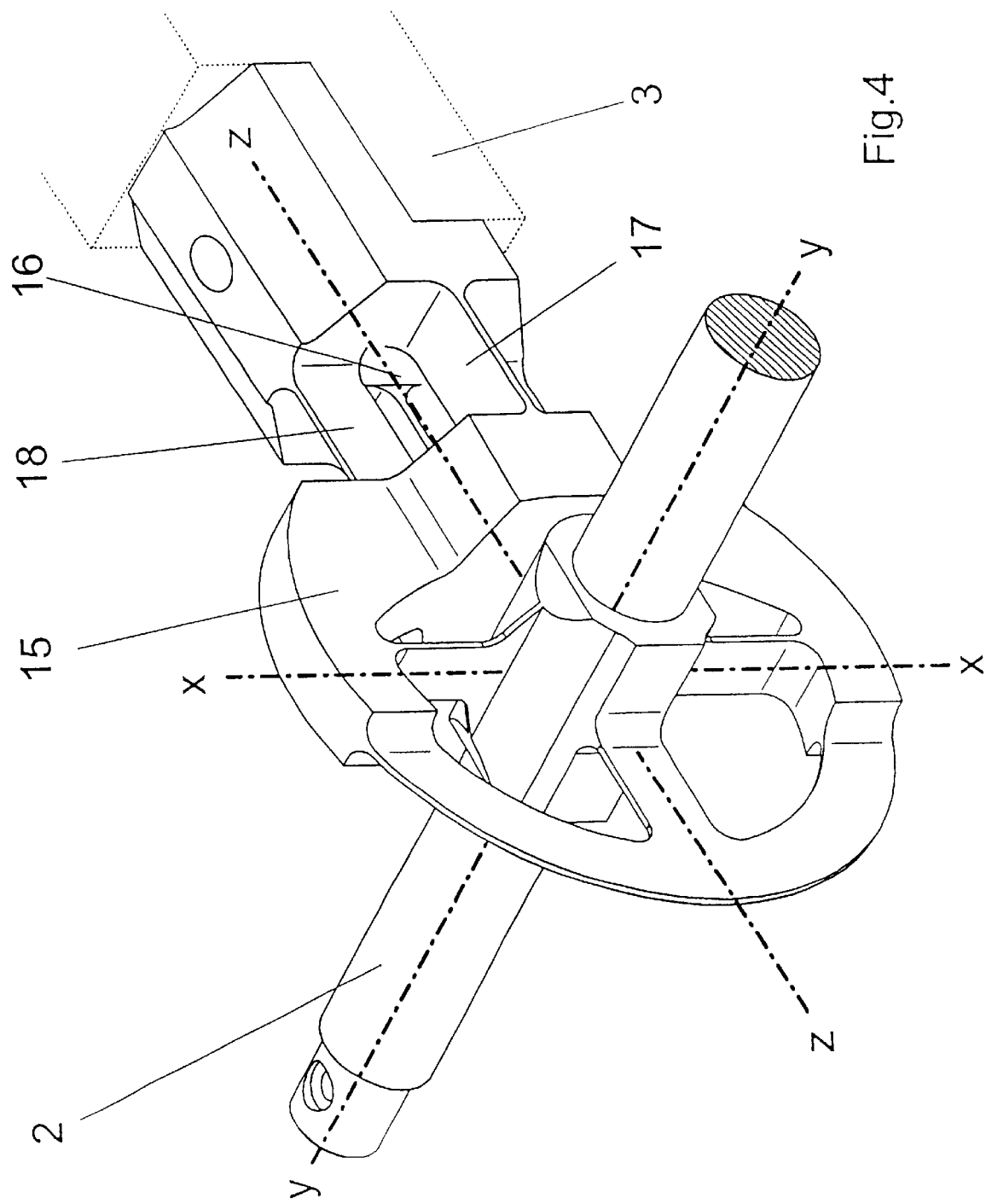
FIG. 4 shows the spindle nut holder with a coupling piece.

FIG. 4 shows an exemplifying construction of the holder 15 with a coupling piece 16. The motion of the spindle nut 1 is transferred rigidly by at least one link 17 to the lever 3, at least one additional link 18 being provided to prevent any bending of the axis "z—z". Preferably, links 17 and 18 are arranged in pairs around axis "z—z", as shown in FIG. 4.

The coupling piece 16 permits elastic twisting of the holder 15 around axis "z—z", without affecting the rigid transfer of motion from the holder 15 to the lever 3. Preferably, the coupling 16 is connected non-positively with the lever 3.

What is claimed is:

1. A spindle nut holder for a spindle gear for driving levers, comprising:
   a spindle nut defining a spindle axis;
   a frame encircling said spindle nut; and
   a plurality of strip-shaped links each having an elongated, narrow cross section and first and second ends, said first end of each of said links being connected to said spindle nut and said second end of each of said links being connected to said frame, and
   said links including a pair of first links and at least one second link, said first links and said at least one second link being oriented in a direction perpendicular to the spindle axis and said cross section of said first links providing longer sides and shorter sides, said longer sides of said cross section of said first links being parallel to the spindle axis, said cross section of said second link providing longer sides and shorter sides, said first links and said second link being arranged relative to one another such that said longer sides of said cross section of said second link are perpendicular to said longer sides of said cross section of said first links.

2. The spindle nut holder of claim 1, wherein said spindle nut, said links, and said frame are formed from one workpiece.

3. The spindle nut holder of claim 1, further comprising a centering pin, said spindle nut, said links, said frame and said centering pin being formed from one workpiece.

4. The spindle nut holder of claim 3, wherein said holder defines a contact pressure surface proximate said centering pin.

5. The spindle nut holder of claim 1, wherein said links, said frame and spindle nut are made from a non-magnetic, cryogenic material.

6. The spindle nut holder of claim 1, wherein said links are flexible.

7. The spindle nut holder of claims 1 or 2, further comprising a coupling piece attached to said frame by means of strip-shaped pairs of links each having a first end connected to a contact pressure surface of said frame and a second end connected to said coupling piece.

8. The spindle nut holder of claim 7, wherein said links between said frame and said coupling piece are oriented perpendicular to the contacting pressure surface of said frame.

9. The spindle nut holder of claim 7, wherein said links between said frame and said coupling piece comprise a first pair of first and second links and a second pair of first and second links,
   said first and second links in said first pair of links each having a cross section having longer sides and shorter sides with each of said longer sides of said first link being in alignment with a respective longer side of said second link,
   said first and second links in said second pair of links each having a cross section having longer sides and shorter sides with each of said longer sides of said first link being in alignment with a respective longer side of said second link.

10. The spindle nut holder of claim 9, wherein said longer sides of said cross section of said first and second links in said first pair of links between said frame and said coupling piece are arranged perpendicular relative to said longer sides of said cross section of said first and second links in said second pair of links between said frame and said coupling piece.

11. The spindle nut holder of claim 10, wherein said longer sides of said cross section of said first and second links of said first pair of links between said frame and said coupling piece are aligned parallel to the spindle axis.

12. A spindle nut holder, comprising
   a spindle nut defining a spindle axis;
   a frame encircling said spindle nut; and
   a plurality of strip-shaped links each having an elongated, narrow cross section, first and second ends and being oriented in a direction perpendicular to the spindle axis, said first end of each of said links being connected to said spindle nut and said second end of each of said links being connected to said frame,
   a cross sectional orientation of said first link being offset from a cross sectional orientation of said second link by 90°, wherein said cross section of said first link provides longer sides and shorter sides, said longer sides of said cross section of said first link being parallel to the spindle axis, said cross section of said second link providing longer sides and shorter sides, said first link and said second link being arranged relative to one another such that said longer sides of said cross section of said second link are perpendicular to said longer sides of said cross section of said first link.

13. The spindle nut holder of claim 12, wherein a cross sectional orientation of a third one of said links is offset from a cross sectional orientation of said second link by 90°.

14. The spindle nut holder of claim 13, wherein said first and third links are arranged in alignment with one another.

15. The spindle nut holder of claim 12, wherein said links are flexible.

16. A spindle nut holder, comprising
   a spindle nut defining a spindle axis;
   a frame encircling said spindle nut; and
   a plurality of strip-shaped links each having an elongated, narrow cross section, first and second ends and being oriented in a direction perpendicular to the spindle axis, said first end of each of said links being connected to said spindle nut and said second end of each of said links being connected to said frame, at least a first one of said links being arranged perpendicular to a second one of said links, wherein said cross section of said first link provides longer sides and shorter sides, said longer sides of said cross section of said first link being parallel to the spindle axis, said cross section of said second link providing longer sides and shorter sides, said first link and said second link being arranged relative to one another such that said longer sides of said cross section of said second link are perpendicular to said longer sides of said cross section of said first link.

17. The spindle nut holder of claim 16, wherein a third one of said links is arranged perpendicular to said second link, said first and third links being arranged in alignment with one another.

18. The spindle nut holder of claim 16, wherein said links are flexible.

* * * * *